Jan. 2, 1934.  L. FRALEY  1,941,856
HOSE CONNECTION
Filed April 29, 1932
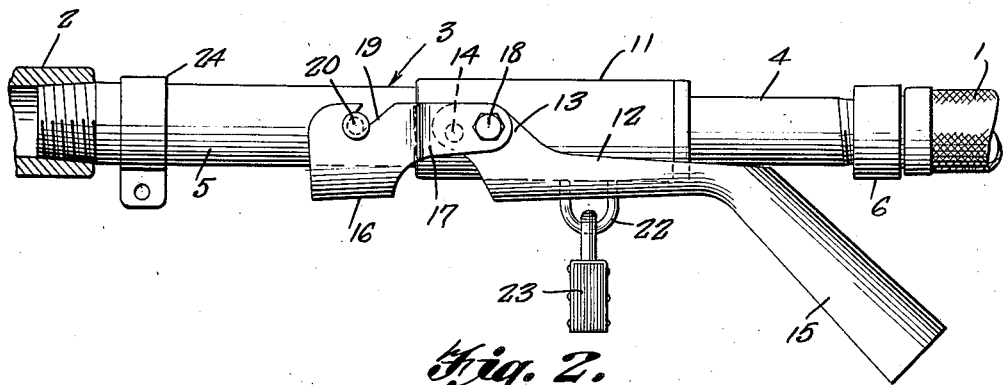
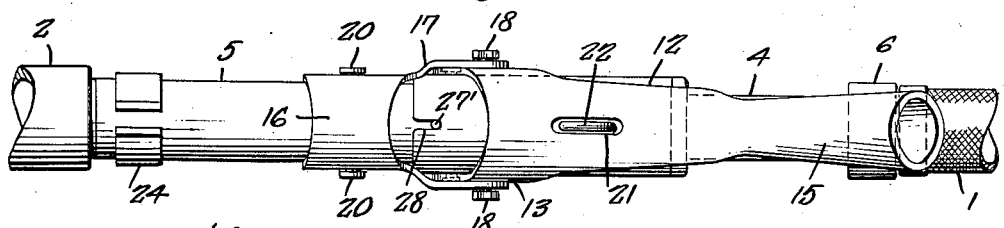
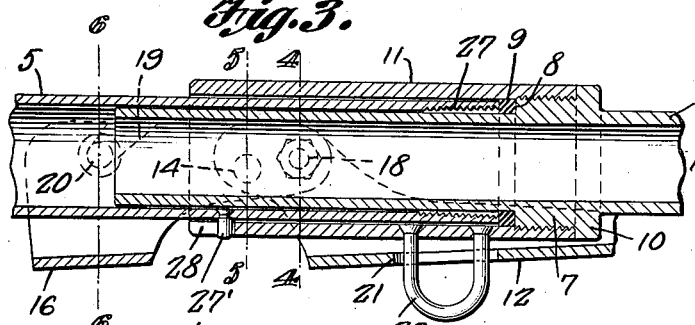
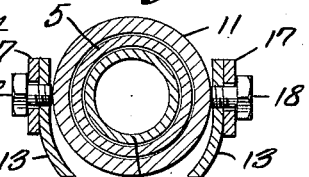
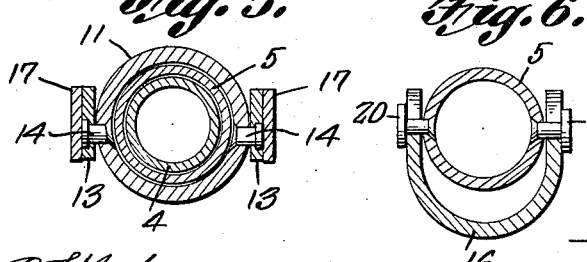
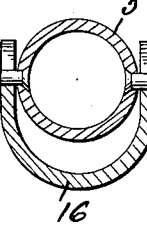
Louis Fraley,
INVENTOR
BY Victor J. Evans & Co.
ATTORNEY Patented Jan. 2, 1934

1,941,856

UNITED STATES PATENT OFFICE 1,941,856

HOSE CONNECTION

Louis Fraley, Cooper, Okla., assignor of one-tenth to Richard A. Pulliam, Cooper, Oklahoma Application April 29, 1932. Serial No. 608,313

1 Claim. (Cl. 285—171)

This invention relates to hose connections and has for the primary object, the provision of a coupling especially adapted for detachably connecting a hose to a source of supply and comprising male and female coupling sections provided with means for detachably connecting said sections without the employment of screw-threads or similar fasteners and which provides a leak-proof connection and one which may be easily and quickly connected or disconnected when desired.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a hose connection constructed in accordance with my invention.

Figure 2 is a plan view illustrating the same.

Figure 3 is a fragmentary sectional view illustrating the male and female sections held together by manually operated means whereby said sections may be disconnected.

Figure 4 is a transverse sectional view taken on the line 4—4 of Figure 3.

Figure 5 is a similar view taken on the line 5—5 of Figure 3.

Figure 6 is a similar view taken on the line 6—6 of Figure 3.

Figure 7 is a detail view showing a plug applied to one of the pipe sections.

Referring in detail to the drawing, the numeral 1 indicates a hose adapted to be connected to a supply pipe 2 by a coupling 3 constructed in accordance with my invention. The coupling 3 consists of male and female pipe sections 4 and 5. The free ends of the pipe sections 4 and 5 are threaded and the pipe section 5 is threaded into the pipe 2 while the section 4 is threaded into a collar 6 of the hose 1.

The male pipe section 4 has an enlargement 7 formed thereon forming an annular shoulder 8 to be engaged by a gasket 9. The enlargement 7 has formed thereon a flange 10 forming an annular shoulder to be engaged by one end of a protecting sleeve 11. One end of the protecting sleeve 11 is internally screw-threaded and threaded to the enlargement 7 with abutting engagement with the flange 10. The protecting sleeve 11 is spaced from the male pipe section 4 to slidably receive therebetween the female pipe section 5, the free end of which abuts the gasket 9 establishing a leak-proof connection between the male and female pipe sections, it being noted that the gasket is closely engaged on all sides so that a completely sealed joint is provided. The threaded mounting of the sleeve on the male section provides for adjustment to compensate for wear and afford ready access when a new gasket is to be applied.

A lever 12 is transversely curved to conform to the contour of the sleeve 11 and is provided with spaced ears or arms 13 pivoted to the sleeve as shown at 14. The lever 12 is provided with a handle 15 extending angularly from the lever whereby a person may readily swing the lever 12 on its pivot, and may readily grasp the lever at all times, the use of a pry to start releasing movement being unnecessary. The yoke 16 is provided with spaced arms 17 eccentrically pivoted to the arms 13 as clearly shown at 18 in Figure 1. The yoke 16 is provided with oppositely disposed notches 19 in its side edges to receive pins 20 on the female pipe section 5 and support the yoke when said lever 12 is moved away from the sleeve 11. When the lever is swung into engagement with said sleeve the yoke engaged with the pins will draw the female pipe section 5 tightly against the gasket 9 and thereby establish a leak-proof connection between the male and female pipe sections and one that may be readily disconnected when desired.

The lever 12 is provided with a slot 21 to receive a keeper 22 carried by the sleeve 11 and through which a padlock or similar device 23 may be passed for locking the lever in coupling position.

A split cuff 24 is mounted on the female pipe section 5 to receive a rod 25 to which is pivoted a closure plug 26 and said rod 25 has one end bent angularly. The closure plug 26 is provided with screw threads adapted to mesh with threads 27 formed in the female pipe section when it is desired to close said female pipe section against the passage of fluid therethrough and with the male pipe section of the coupling disconnected therefrom. The padlock 23 may be placed through openings in the cuff 24 to prevent the detachment of the rod 25 therefrom when the plug 26 is threaded in the pipe section 5.

The female pipe section 5 is provided with a lug 27 adapted to enter an open-ended slot 28 in the end of the sleeve 11 when said male and female pipe sections are drawn into coupling position, thereby aligning the sections so that the keeper 22 will be aligned with the slot in the lever and will not interfere with the movements of the lever.

While I have shown and described the preferred embodiment of my invention, it will be understood that minor changes in construction, combination and arrangement of parts may be made without departing from the spirit and scope of my invention, as claimed.

Having thus described my invention, what I claim is:

A coupling comprising male and female sections, the male section being enlarged near its attaching end to define an annular shoulder and an annular flange and having its surface threaded between the shoulder and the flange, a gasket encircling the section against said shoulder, a sleeve engaged with the threaded surface of the male section and abutting said flange and overlying the gasket and receiving therein the female section to engage the gasket, a lever including a transversely curved portion having spaced extensions pivoted to said sleeve, a yoke pivoted eccentrically to said extensions and having oppositely arranged notches in its side edges, oppositely arranged pins carried by the female section and received by the notches to cause the female section to be drawn into engagement with the gasket on pivotal movement of the lever in one direction, said lever having a portion thereof angularly disposed and of tubular construction to form a handle, the sleeve having an open-ended slot in its end, and a projection on the female section engaging said slot, the sleeve and handle being constructed for application of a lock.

LOUIS FRALEY.